United States Patent
Söderberg et al.

(10) Patent No.: US 11,075,014 B2
(45) Date of Patent: Jul. 27, 2021

(54) FILTER ZONES WITH DIFFERENT FILTERING EFFICIENCIES FOR A FUEL ASSEMBLY OF A NUCLEAR WATER REACTOR

(71) Applicant: WESTINGHOUSE ELECTRIC SWEDEN AB, Västerås (SE)

(72) Inventors: Håkan Söderberg, Västerås (SE); Sven Pettersson, Stockholm (SE); Anders Söderlund, Surahammar (SE)

(73) Assignee: Westinghouse Electric Sweden AB, Vasteras (SE)

( * ) Notice: Subject to any disclaimer, the term of this patent is extended or adjusted under 35 U.S.C. 154(b) by 232 days.

(21) Appl. No.: 16/330,496

(22) PCT Filed: Feb. 20, 2017

(86) PCT No.: PCT/EP2017/053751
§ 371 (c)(1),
(2) Date: Mar. 5, 2019

(87) PCT Pub. No.: WO2018/046142
PCT Pub. Date: Mar. 15, 2018

(65) Prior Publication Data
US 2019/0198183 A1 Jun. 27, 2019

Related U.S. Application Data

(60) Provisional application No. 62/383,817, filed on Sep. 6, 2016.

(51) Int. Cl.
*G21C 3/32* (2006.01)
*G21C 19/307* (2006.01)
*G21C 3/33* (2006.01)

(52) U.S. Cl.
CPC ......... *G21C 3/3206* (2013.01); *G21C 3/3305* (2013.01); *G21C 19/307* (2013.01); *Y02E 30/30* (2013.01)

(58) Field of Classification Search
CPC .. G21C 3/3206; G21C 3/3305; G21C 19/307; Y02E 30/30
See application file for complete search history.

(56) References Cited

U.S. PATENT DOCUMENTS

| | | | | |
|---|---|---|---|---|
| 4,664,880 A | * | 5/1987 | Bryan | G21C 3/3206 376/352 |
| 5,030,412 A | * | 7/1991 | Yates | G21C 3/3206 376/352 |

(Continued)

FOREIGN PATENT DOCUMENTS

| | | |
|---|---|---|
| EP | 2487690 A2 | 8/2012 |
| EP | 2487690 B1 | 4/2015 |

(Continued)

OTHER PUBLICATIONS

International Search Report issued in corresponding PCT Application No. PCT/EP2017/053751, dated May 24, 2017, pp. 1-2.

(Continued)

*Primary Examiner* — Darlene M Ritchie
(74) *Attorney, Agent, or Firm* — Murtha Cullina LLP (57) ABSTRACT

A fuel assembly for a nuclear water reactor having an upstream end, a downstream end, and a flow interspace between the upstream and downstream ends. Fuel rods are provided in the flow interspace between the upstream and downstream ends. The flow interspace permits a flow of coolant through the fuel assembly along a flow direction from the upstream end to the downstream end. A filter device is provided to catch debris particles in the flow of coolant. The filter device has a first filter zone for a major part of the flow of coolant, and a second filter zone for a minor part of (Continued)

the flow of coolant. The first filter zone has a first filtering efficiency and the second filter zone has a second filtering efficiency. The second filtering efficiency is higher than the first filtering efficiency.

17 Claims, 6 Drawing Sheets (56) References Cited

U.S. PATENT DOCUMENTS

| | | | | |
|---|---|---|---|---|
| 5,473,649 | A * | 12/1995 | Olsson | G21C 3/32 376/313 |
| 5,483,564 | A * | 1/1996 | Matzner | G21C 3/3206 376/352 |
| 5,539,793 | A * | 7/1996 | Johansson | G21C 3/3206 376/443 |
| 7,149,272 | B2 | 12/2006 | Soderlund et al. | |
| 8,317,035 | B2 * | 11/2012 | Elkins | G21C 3/3206 210/521 |
| 8,475,659 | B2 * | 7/2013 | Oh | B01D 29/012 210/232 |
| 9,583,222 | B2 * | 2/2017 | Friedrich | G21C 3/32 |
| 2004/0076253 | A1 * | 4/2004 | Soderlund | G21C 3/322 376/310 |
| 2007/0138072 | A1 * | 6/2007 | Bilannin | B01D 24/008 210/153 |
| 2008/0152069 | A1 * | 6/2008 | Aktas | G21C 3/322 376/362 |
| 2008/0296236 | A1 * | 12/2008 | Gross | B01D 29/23 210/791 |
| 2009/0120880 | A1 * | 5/2009 | Bushart | G21C 19/46 210/663 |
| 2012/0207262 | A1 * | 8/2012 | Diller | G21C 3/3305 376/313 |
| 2013/0170601 | A1 * | 7/2013 | Varrin, Jr. | G21C 5/02 376/313 |
| 2014/0056397 | A1 * | 2/2014 | Friedrich | G21C 3/3206 376/313 |

FOREIGN PATENT DOCUMENTS

| | | |
|---|---|---|
| JP | 2004077127 A | 3/2004 |
| JP | 2011247651 A | 12/2011 |
| JP | 2012177692 A | 9/2012 |
| JP | 2014519032 A | 8/2014 |
| WO | 9828752 A1 | 7/1998 |

OTHER PUBLICATIONS

International Preliminary Report on Patentability and Written Opinion issued in corresponding PCT Application No. PCT/EP2017/053751, dated Mar. 21, 2019, pp. 1-12.

* cited by examiner

FILTER ZONES WITH DIFFERENT FILTERING EFFICIENCIES FOR A FUEL ASSEMBLY OF A NUCLEAR WATER REACTOR

THE TECHNICAL FIELD OF THE INVENTION

The present invention refers to a fuel assembly configured to be positioned in a nuclear water reactor, especially a heavy water reactor or a light water reactor, LWR, such as a boiling water reactor, BWR, or a pressurized water reactor, PWR, of a nuclear plant.

More precisely, the present invention refers to a fuel assembly configured to be positioned in a nuclear water reactor, wherein the fuel assembly comprises a plurality of fuel rods, an upstream end, a downstream end, the fuel rods being provided between the upstream end and the downstream end, a flow interspace between the fuel rods of the fuel assembly and between the upstream end and the downstream end, the flow interspace being configured to permit a flow of a coolant through the fuel assembly along a flow direction from the upstream end to the downstream end in contact with the fuel rods, a filter device provided in the coolant flow between the upstream end and the fuel rods and configured to catch debris particles in the coolant flow.

BACKGROUND OF THE INVENTION AND PRIOR ART

Such a fuel assembly is known from WO98/28752. The known fuel assembly comprises a filter device, which is provided in the flow of coolant between an upstream end and the fuel rods, and configured to catch debris particles in the coolant flow. The filter device comprises a plurality of through-holes for the coolant and large by-pass holes for the coolant. In one example shown in WO98/28752, a second filtering member is provided downstream the plurality of through-holes and the by-pass holes.

The purpose of the coolant in a water reactor is to function as a cooling fluid and a moderator in the nuclear water reactor of the nuclear plant. It is important to secure a flow of the coolant through the fuel assembly in order to ensure a proper cooling of the fuel and a proper moderation of the neutrons.

The general purpose of the filter device is to catch debris particles in the coolant, and thus to prevent debris particles from being caught at a higher position in the fuel assembly, especially in the spacers where the debris particles may cause fretting on the cladding of the fuel rods. Fretting may result in a primary defect, a small hole through the cladding, and at a later stage in a secondary defect, i.e. break of the fuel rod, which may cause uranium to leak out into the coolant. In case of a secondary defect, the operation of the reactor has to be interrupted and the failed fuel rod be replaced. Such a replacement is time-consuming and expensive. Debris particles in the coolant may of course also cause defects to other components in a nuclear plant, for instance pumps.

The filter devices, mounted in the fuel assemblies that are marketed and sold today, are dimensioned to catch debris particles having a determined minimum size. This minimum size has been considered to be the smallest size the debris particles may have in order to be caught by the spacers and constitute a significant risk to cause fretting.

Smaller debris particles are considered not to be caught by the spacers. Here a problem may arise. Albeit the probability to get caught in a spacer is very low there is no reliable natural sink for a debris particles in the reactor primary system and it will hence circulate indefinitely. The time lapse for each passage is in the order of 1 minute and in each passage it passes about 10 spacers. This combines to several million chances over the lifetime of the fuel. A low probability that is not exactly zero may hence still pose a risk due to the many chances that occurs.

There are debris particles of different kinds, especially regularly shaped particles, such as spherical or approximately spherical particles, and irregularly shaped particles, such as elongated particles, including wires, filaments, flakes and chips.

Smaller spherical or approximately spherical particles having a determined minimum size with a diameter of more than about 1 mm are not allowed to pass through the filter device. Spherical particles smaller than the determined minimum size are less reluctant to get caught in the fuel assembly, for instance in the spacers. In addition, if such a small spherical particle is caught in the spacer, there is a high probability that it will be fixed in a position in the spacer, and thus the particle will not vibrate. Consequently, the risk for fretting is low for spherical or approximately spherical particles.

Irregularly shaped particles, such as elongated particles, including wires, filaments, flakes and chips, are more problematic. They tend to get caught by the spacers in the fuel assembly. Due to their shape, they may, when caught, vibrate in the coolant flow, which could result in fretting of the cladding of an adjacent fuel rod. The filter devices used today should fulfill the requirements of catching such irregularly shaped particles larger than a determined minimum size, for instance elongated particles with a length of more than 10 mm and a thickness of more than a few tenths of a mm. Elongated particles with a shorter length and a thinner thickness may be allowed to pass through the filter device.

EP-2487690 discloses another fuel assembly comprising a filter device, which is provided in the flow of coolant between an upstream end and the fuel rods, and configured to catch debris particles in the coolant flow. The filter device comprises a plurality of through-holes for the coolant. Upstream the filter device, there is a debris retention device comprising a central flow channel defining a plurality of cells. The debris retention device also comprises straining plates for collecting debris. The straining plates comprises fine perforations permitting a small backflow of coolant.

U.S. Pat. No. 7,149,272 discloses a fuel assembly for a nuclear water reactor comprising a plurality of fuel rods, an upstream end and a downstream end. The fuel rods are provided between the upstream end and the downstream end. A flow interspace is provided between the fuel rods and between the upstream end and the downstream end. The flow interspace permits a flow of a coolant through the fuel assembly along a flow direction from the upstream end to the downstream end in contact with the fuel rods. A filter device is provided in the coolant flow between the upstream end and the fuel rods and configured to catch debris particles in the coolant flow.

SUMMARY OF THE INVENTION

In order to further increase the safety of nuclear plants and further reduce the risk for primary defects, it may be important to catch also smaller debris particles, especially elongated particles, having a smaller size than said determined minimum size, or in other words to interrupt indefinite circulation of such particles.

If the filter device would be dimensioned for such smaller debris particles, there is however an increased risk for clogging of the filter device or at least partial clogging of the filter device. Clogging or partial clogging results in an increased pressure drop over the filter device, and a reduced flow of coolant through the fuel assembly.

An object of the present invention is to overcome this problem and thus to provide a filter device which is able of catching smaller debris particles, especially elongated particles, and which is able of maintaining a flow of coolant through the filter device.

This object is achieved by the fuel assembly initially defined, which is characterized in that the second filtering efficiency is higher than the first filtering efficiency.

In such a filter device, the second filter zone is configured to catch smaller debris particles that the first filter zone.

The filtering efficiency of the respective filter zone is the ratio of particles caught by the respective filter zone over the total number of particles present in the coolant upstream of the filter zone. The filtering efficiency can be based on the determined particle size or on the total number of particles of all sizes.

The filter device is based on the principle that the coolant flow, in which debris particles may be present, is circulated through the filter device, wherein smaller debris particles are allowed to pass the first filter zone a number of times before they finally pass and get caught in the second filter zone.

According to an embodiment of the invention, the second filter zone is dimensioned to permit the second filter zone to be clogged, especially after a determined period of operation of the reactor, wherein the first filter zone is configured to secure a sufficient flow of coolant through the first filter zone even if no coolant passes the second filter zone. The flow through the first filter zone only is thus sufficient to secure a proper operation of the fuel assembly.

Considering the circulation time for the coolant through the reactor being, for instance, one minute, and the second filter zone being a tenth of the first filter zone, a particle introduced into the coolant would reach on average the second filter zone within ten minutes.

According to a further embodiment of the invention, the filter device is provided in the flow interspace to guide at the most a minor part of the flow of coolant through the second filter zone. Thus the second filter zone may be smaller or cover a smaller area than the first filter zone, i.e. the first filter zone has a first filter area $A_1$ and the second filter zone has a second filter area $A_2$, wherein the second filter area $A_2$ is smaller than the first filter area $A_1$. For instance, the second filter zone may cover at most 40%, 30%, 20%, 10% or 5% of the total area of the filter device.

The second filter zone may thus be arranged to permit a part of the flow of coolant passing by the second filter zone, or more precisely may be arranged in the flow interspace to permit a part of the flow of coolant passing by the second filter zone in the flow interspace.

According to a further embodiment of the invention, the filter device is provided in the flow interspace to guide at least a major part of the flow of coolant through the first filter zone.

According to a further embodiment of the invention, the first filter zone comprises an inlet end turned towards the upstream end, and an outlet end, and is arranged to guide said at least a part of the flow of coolant to pass the first filter zone through the passages from the inlet end to the outlet end, wherein the second filter zone comprises an inlet end turned towards the upstream end, and an outlet end, and is arranged to guide said at the most a part of the flow of coolant to pass the second filter zone through the passages from the inlet end to the outlet end.

According to a further embodiment of the invention, the first filter zone and the second filter zone are provided beside each other. The flow of coolant may thus be divided into the major part and the minor part, wherein the major part is guided through the first filter zone and the minor part is guided through the second filter zone. The major part and the minor part may thus be guided in parallel with each other along the flow direction.

According to a further embodiment of the invention, the filter device is provided in the flow interspace to guide the entire flow of coolant through the first filter zone. The entire flow of coolant may thus pass through the first filter zone, wherein a minor part of the flow also passes through the second filter zone at a distance from the first filter zone along the flow direction.

According to a further embodiment of the invention, the second filter zone is provided at a distance from the first filter zone along the flow direction. The second filter zone may be provided in the flow of coolant between the upstream end and the downstream end.

According to a further embodiment of the invention, the second filter zone is provided downstream the first filter zone. Advantageously, the second filter zone may be provided between the first filter zone and the fuel rods.

According to a further embodiment of the invention, the second filter zone is provided upstream the first filter zone. Advantageously, the second filter zone may be provided between the upstream end and first filter zone.

According to a further embodiment of the invention, each of the passages of the first filter zone defines a first flow area and each of the passages of the second filter zone defines a second flow area, which is smaller than the first filter area.

According to a further embodiment of the invention, each of the passages of the first filter zone defines a first passage length from an inlet end to an outlet end, and each of the passages of the second filter zone defines a second passage length from an inlet end to an outlet end, which second passage length is longer than the first passage length.

According to a further embodiment of the invention, the first filter zone has a first pressure loss coefficient $\xi_1$ and the second filter zone a second pressure loss coefficient $\xi_2$ and wherein the second pressure loss coefficient $\xi_2$ is greater than the first pressure loss coefficient $\xi_1$. This is valid from the beginning of the fuel cycle when the fuel assembly is to be loaded for the first time into the core of the nuclear water reactor, and to a higher extent after operation during a determined period of time.

According to a further embodiment of the invention, the first filter zone has a first flow area $A_1$ and the second filter zone a second flow area $A_2$ and wherein the first flow area $A_1$ is greater than the second flow area $A_2$.

In all the described embodiments the first and the second filter zones can be regarded as two parallel flow pathways. In each case the second filter zone is either a true separate pathway or it is a separate pathway together with a dedicated part of the first filter zone. The pressure loss over two such parallel pathways connected at both ends must be the same. This leads to the following flow relation valid for turbulent single phase flow:

$$\frac{m_2}{m_1} = \sqrt{\frac{\xi_1}{\xi_2}} \cdot \frac{A_2}{A_1}.$$

wherein, as partly mentioned above, m is the mass flow, $\xi$ is the pressure loss coefficient, and A is the flow area. Indices 1 and 2 denote the first and the second filter area. The total area becomes $A=A_1+A_2$ and the total flow becomes $m=m_1+m_2$.

An example could then be that $A_2$ is 10% and that $\xi_2$ is 4 times larger than $\xi_1$ due to the higher filtering efficiency. The flow relation then becomes 0.056, i.e. 5.6% of the flow goes through the second zone and 94.4% goes through the first zone.

The relation also illustrates what happens if the second zone gets clogged by debris. The pressure loss coefficient $\xi_2$ then becomes very large and the mass flow $m_2$ tends to zero. The remaining mass flow is then $m_1$ only. The effect of this is largest if the clogging happens to a single assembly in the core of the nuclear water reactor. There is then no compensating effect from an increased pump speed that would occur if many assemblies are affected. The effect of the potential coolant loss may by the skilled person be considered in the critical power safety analysis.

From the flow relation it is also obvious that both the flow area and the designed pressure loss coefficient for the second filter zone determine the potential flow loss at clogging. The safety analysis may be designed to determine how much can be accepted and the associated risk for the critical power performance.

According to a further embodiment of the invention, the filter device comprises magnetic members provided to act on at least some of the passages of the second filter zone to attract debris particles flowing through the passages of the second filter zone.

According to a further embodiment of the invention, the passages of the first filter zone and the second filter zone are formed by a plurality of sheets, which are arranged beside each other and oriented along the flow direction, wherein adjacent sheets of the first filter zone are provided at a larger distance from each other than adjacent sheets of the second filter zone. In such a filter device, the first filtering efficiency and the second filtering efficiency, respectively, is determined by the distance between adjacent sheets. The filtering efficiency may thus be adjusted by changing the distance between the adjacent sheets.

According to a further embodiment of the invention, each sheet comprises a first portion, which extends from the inlet end, a second portion, which extends from the outlet end, and a third portion, which extends between the first portion and the second portion, and wherein each sheet along the first portion has a wave-shape extending in a direction transversally to the flow direction and along the third portion has a wave-shape extending in the flow direction.

Such a filter device, which may be manufactured of relatively thin sheets, has a low flow resistance since no components, connection members or the like are required in the passages. Thanks to the wave-shape of the sheets, the plurality of separate passages, which are arranged beside each other and which enable an efficient catching of particles in the cooling water, are obtained. In particular, elongated particles contained in the flow of cooling and having an extension which substantially extends transversally to the flow direction, may be caught by the filter device by means of the wave-shape of the first portion of the first filter zone and the second filter zone. The particles having an extension extending substantially in parallel with the flow direction, will be caught by the filter device by means of the wave-shape of the third portion of the first filtering zone and the second filtering zone. The wave-shape of the sheets into directions perpendicular to each other also gives a high strength to the filter, which thus may be made self-supporting and may be mounted in for instance a fuel assembly without any frame extending around the sheets.

According to a further embodiment of the invention, each sheet along the second portion has a wave-shape in the direction transversally to the flow direction.

According to a further embodiment of the invention, the wave-shapes are continuous. Consequently, there are no sharp transitions.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
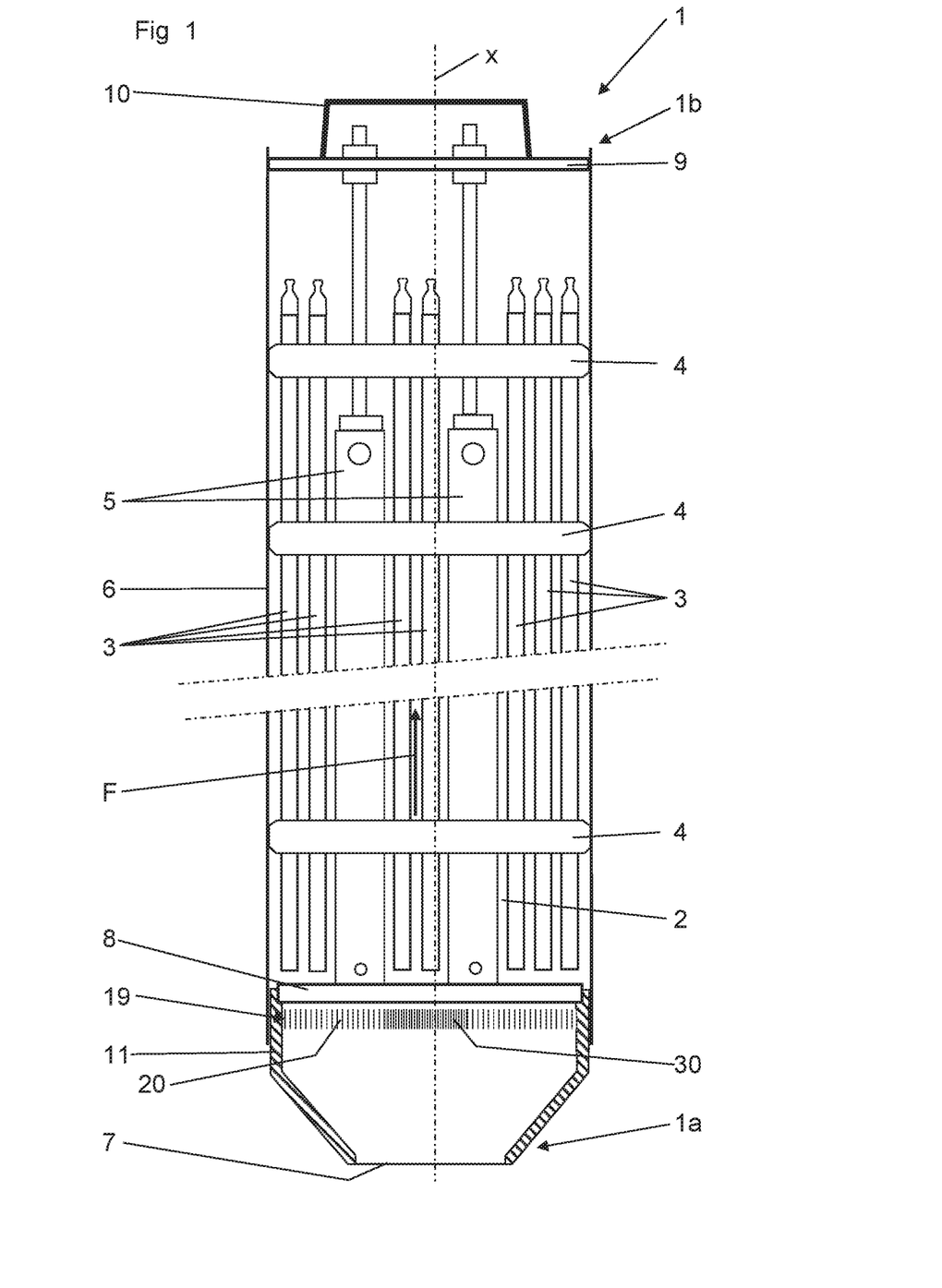
FIG. 1 discloses a longitudinal section through a fuel assembly according to a first embodiment of the invention.
Figure 2:
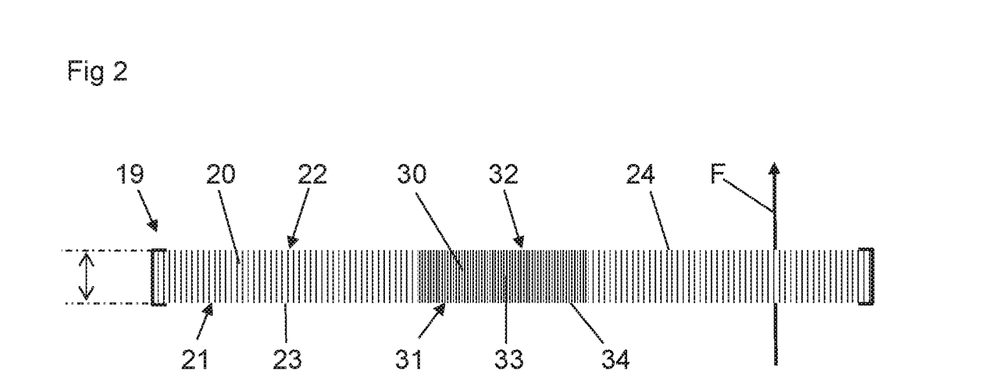
FIG. 2 discloses a longitudinal section through a filter device of the fuel assembly in FIG. 1.
Figure 3:
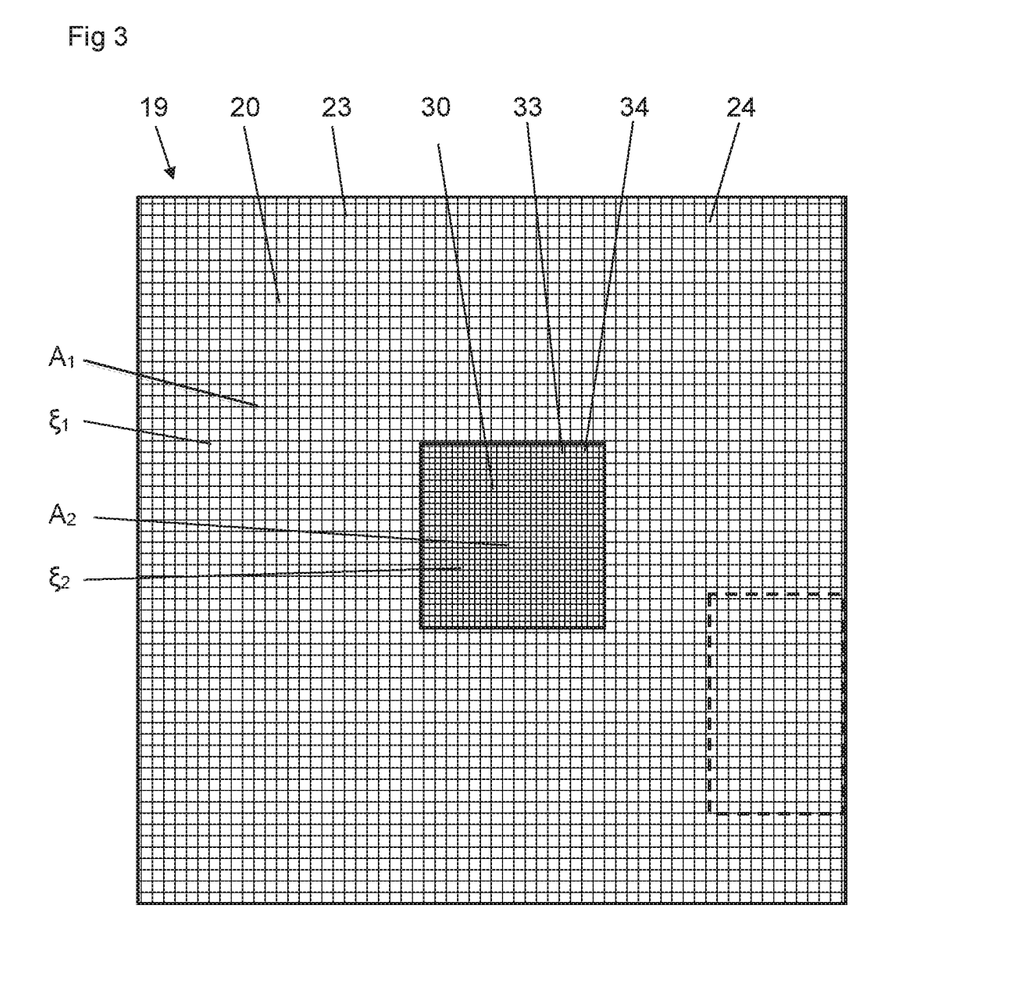
FIG. 3 discloses a plan view of the filter device in FIG. 2.

FIGS. 1 to 3 disclose a first embodiment of a fuel assembly 1 configured to be positioned in a nuclear water reactor, and more precisely a boiling water reactor, BWR. The fuel assembly 1 has an elongated shape and extends along a longitudinal axis x between an upstream end 1a and a downstream end 1b. During use of the fuel assembly 1 in the reactor, the upstream end 1a forms a lower end and the downstream end 1b forms an upper end of the fuel assembly 1. A flow interspace 2 is provided in the fuel assembly 1 between the upstream end 1a and the downstream end 1b.

A plurality of fuel rods 3 is provided in the flow interspace 2 between the upstream end 1a and the downstream end 1b. The fuel rods 3 are held by means of spacers 4. In the first embodiment, the spacers 4 are attached to a number of water rods 5, two of which are shown in FIG. 1.

The fuel assembly 1 also comprises a casing 6 enclosing the fuel rods 3, the spacers 4 and the flow interspace 2, which is configured to permit a flow of coolant through the fuel assembly 1 along a flow direction F from an inlet 7 at the upstream end 1*a* to the downstream end 1*b* in contact with the fuel rods 3.

The water rods 5 are attached to a bottom plate 8 provided beneath the fuel rods 3.

Furthermore, the water rods 5 may also be attached to a top plate 9 at the downstream end 1*a*. The top plate 9 comprises a handle 10. The bottom plate 8, the water rods 5, the top plate 9 and the spacers 4 form a support structure which may be lifted via the handle 10 and carry the weight of the fuel rods 3.

The fuel assembly 1 also comprises a bottom piece 11, frequently designated as a transition piece. The bottom piece 11 extends to the upstream end 1*a* and defines the inlet 7 for the flow of coolant. The bottom piece 11 may be attached to the bottom plate 8 or to the casing 6.

The fuel assembly 1 also comprises a filter device 19 configured to catch debris particles in the flow of coolant. The filter device 19 is provided between the upstream end 1*a* and the fuel rods 3. In the first embodiment, the filter device is provided between the upstream end 1*a* and the bottom plate 8. The filter device 20 may be supported by or attached to the bottom piece 11.

The filter device 19 comprises a first filter zone 20 and a second filter zone 30.

In the first embodiment, the first filter zone 20 and the second filter zone 30 are both provided in the flow of coolant between the upstream end 1*a* and the fuel rods 3, and more precisely between the upstream end 1*a* and the bottom plate 8. Furthermore, the first filter zone 20 and the second filter zone 30 are provided beside each other. As can be seen in FIG. 3, the second filter zone 30 is located in the center of the filter device 19 and thus surrounded by the first filter zone 20. It should be noted that the second filter zone 30 may be located anywhere on the filter device 19, for instance along a side edge as indicated by the dashed line. As also appears, the shape of the contour of the second filter zone 30 may vary.

The first filter zone 20 is greater than the second filter zone 30, i.e. the first filter zone 20 covers at least a major part of the total area of filter device 19 or of the total flow area of the flow interspace 2 at the level of the filter device 19. The second filter zone 30 covers at most a minor part of the total area of the filter device 29 or of the total flow area of the flow interspace 2 at the level of the filter device 19. For instance, the second filter zone 30 may cover at most 40%, 30%, 20%, 10% or 5% of the total area of the filter device 19.

As can be seen more clearly in FIG. 2, the first filter zone 20 comprises an inlet end 21 turned towards the upstream end 1*b*, an outlet end 22 turned towards the downstream end 1*b* and a plurality of passages 23 extending between the inlet end 21 and the outlet end 22. The first filter zone 20 is arranged to guide at least a major part of the flow of coolant to pass the first filter zone 20 through the passages 23 from the inlet end 21 to the outlet end 22 towards the downstream end. The first filter zone 20 has a first filtering efficiency.

The second filter zone 30 comprises an inlet end 31 turned towards the upstream end 1*b*, an outlet end 32 turned towards the downstream end 1*b* and a plurality of passages 33 extending between the inlet end 31 and the outlet end 32. The second filter zone 30 is arranged to guide at most a minor part of the flow of coolant to pass the second filter zone 30 through the passages 33 from the inlet end 31 to the outlet end 32 towards the downstream end 1*b*. The second filter zone 22 has a second filtering efficiency.

The second filtering efficiency is higher than the first filtering efficiency. In the first embodiment, the differing filtering efficiency has been accomplished by each of the passages 23 of the first filter zone 20 defining a first flow area and each of the passages 33 of the second filter zone 30 defining a second flow area, wherein the second flow area is smaller than the first filter area. In other words, the passages 33 of the second filter zone 30 are thinner than the passages 23 of the first filter zone 20 as can be seen in FIG. 2.

In the first embodiment, the passages 23 of the first filter zone 20 are formed by a plurality of sheets 24 arranged beside each other and oriented along the flow direction F. Also the passages 33 of the second filter zone 30 are formed by a plurality of sheets 34 arranged beside each other and oriented along the flow direction F. Adjacent sheets 24 of the first filter zone 20 are provided at a larger distance from each other than adjacent sheets 34 of the second filter zone 30.

It is to be noted, that the passages 23, 33 may be configured in other ways, for instance through holes in a plate, wherein the holes may have a circular or elongated shape seen in the flow direction.

Figure 4:
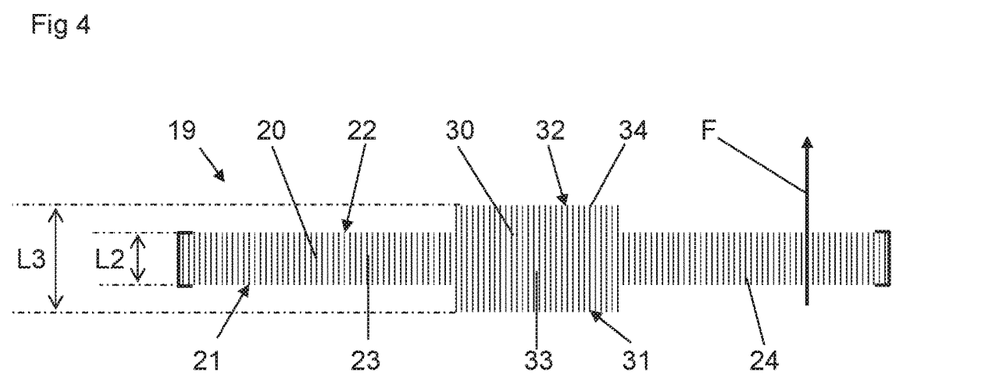
FIG. 4 discloses a longitudinal section through a filter device of a fuel assembly according to a second embodiment of the invention.

FIG. 4 discloses a second embodiment, which differs from the first embodiment only with regard to how the differing filtering efficiency is accomplished. In the second embodiment, each of the passages 23 of the first filter zone 20 defines a first passage length L2 from the inlet end 21 to the outlet end 22, and each of the passages 33 of the second filter zone 30 defines a second passage length L3 from the inlet end 31 to the outlet end 32, wherein the second passage length L3 is longer than the first passage length L2.

It should be noted that the differing filtering efficiency may be accomplished also by a combination of a varying flow area, as in the first embodiment, and a varying passage length, as in the second embodiment.

Figure 5:
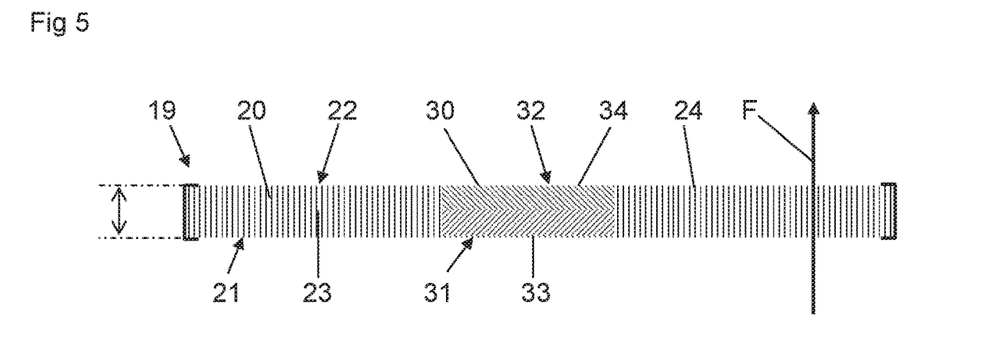
FIG. 5 discloses a longitudinal section through a filter device of a fuel assembly according to a third embodiment of the invention.

FIG. 5 discloses a third embodiment, which differs from the first and second embodiments in that the second filter zone 30 has a differing geometrical configuration than the first filter zone 20. In the fourth embodiment the passages 33 of the second filter zone 30 extend along a curved or bent path whereas the passages 23 of the first filter zone 20 are straight. The passages 33 of the second filter zone 30 may thus be formed by bent sheets 34.

Figure 6:
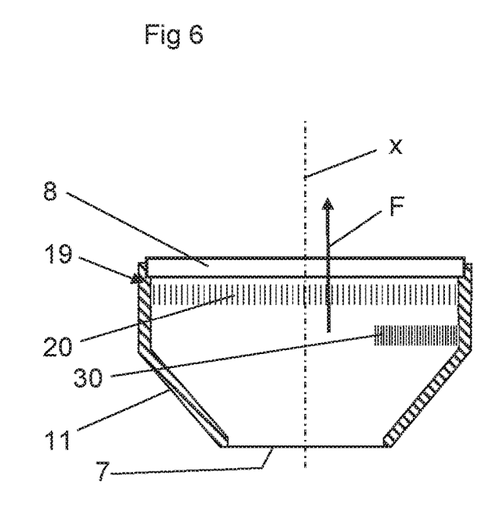
FIG. 6 discloses a longitudinal section through a lower portion of a fuel assembly according to a fourth embodiment of the invention.

FIG. 6 discloses a fourth embodiment, which differs from the first embodiment in that the second filter zone 30 is provided at a distance from the first filter zone 20 along the flow direction F, and more precisely the second filter zone 30 is provided upstream the first filter zone 20. In the third embodiment, the filter device 19 is thus provided in the flow interspace 2 to guide the entire flow of coolant through the first filter zone 20. A minor part of the flow of coolant will be guided through the second filter zone 30, and the first filter zone 20.

Figure 7:
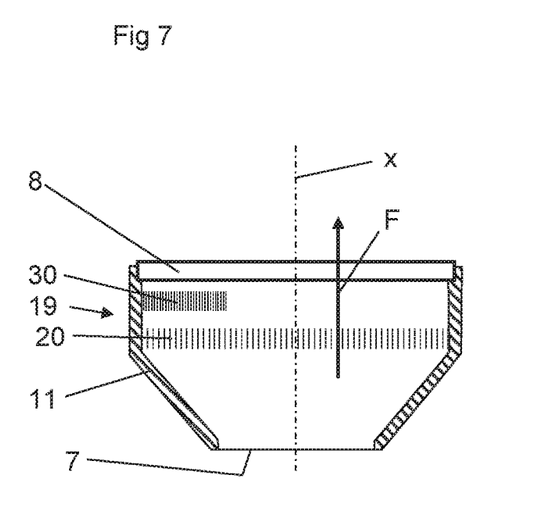
FIG. 7 discloses a longitudinal section through a lower portion of a fuel assembly according to a fifth embodiment of the invention.

FIG. 7 discloses a fifth embodiment, which differs from the fourth embodiment only in that the second filter zone 30 is provided downstream the first filter zone 20.

It should be noted, that the filter devices 19 shown in FIGS. 6 and 7 may be provided with filter zones 20 and 30 as shown in FIGS. 2 to 4.

Figure 8:
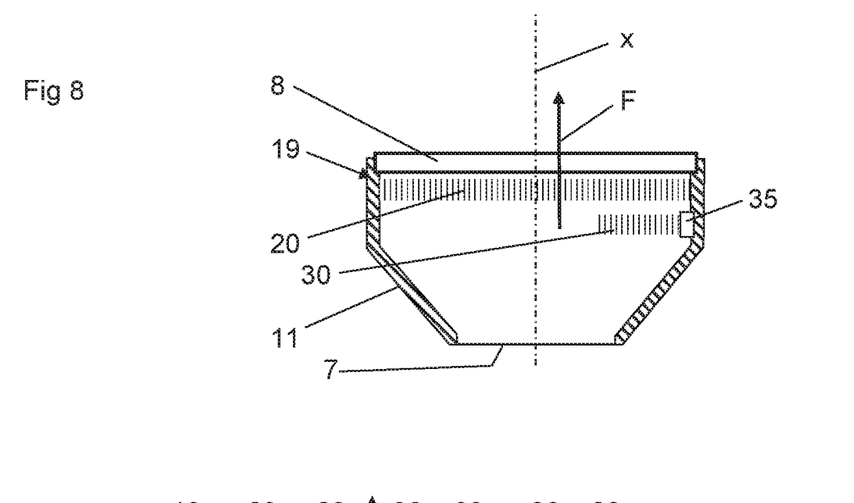
FIG. 8 discloses a longitudinal section through a lower portion of a fuel assembly according to a sixth embodiment of the invention.

FIG. 8 discloses a sixth embodiment of a fuel assembly 1, with a filter device 19 comprising a magnetic member 35 attached to the second filter zone 30. The magnetic member 35 will create a magnetic field on at least some of the passages 33 of the second filter zone 30 to attract debris particles flowing through the passages 33 of the second filter zone 30. The magnetic field will provide the second filtering efficiency. For the rest, the configuration of the first and second filter zones 20, 30 may be identical.

Figure 9:
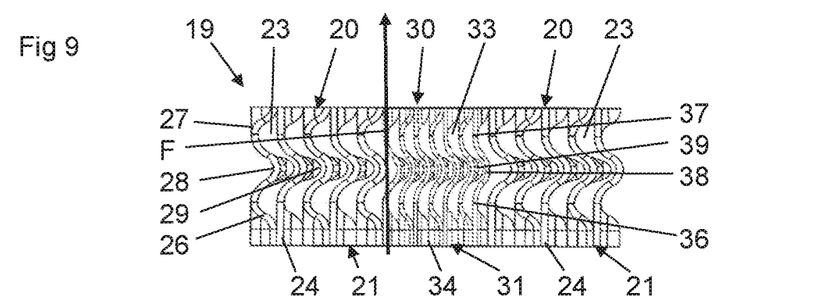
FIG. 9 discloses a longitudinal section through a filter device of a fuel assembly according to a seventh embodiment of the invention.
Figure 10:
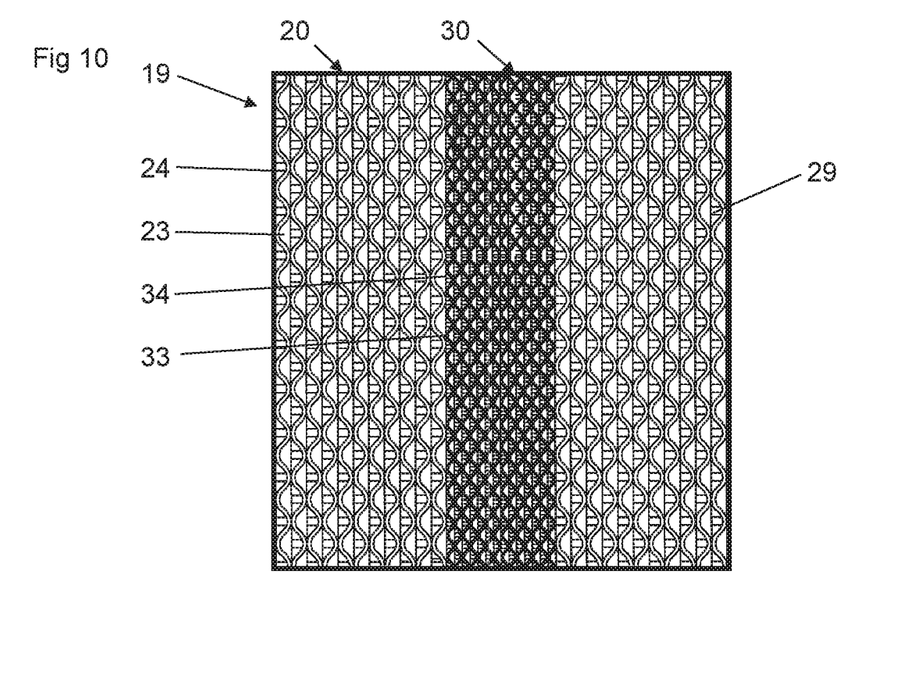
FIG. 10 discloses a plan view of the filter device in FIG. 9.

FIGS. 9 and 10 disclose a filter device 19 of a fuel assembly a according to a seventh embodiment, in which the sheets 24, 34 forming the passages 23, 33 of the first filter zone 20 and the second filter zone 30 have a curved configuration. FIG. 10 illustrates the filter device 19 in a plan view seen from the inlet end 21, 31 along the flow direction F.

Each sheet 24, 34 comprises a first portion 26, 36 which extends from the inlet end 21, a second portion 27, 37 which extends from the outlet end 22, and a third portion 28, 38 which extends between the first portion 26, 36 and the second portion 27, 37.

Each sheet 24, 34 has a first wave-shape along the first portion 26, 36 in a direction transversally to the flow direction F, a second wave-shape along the second portion 27, 37 in a direction transversally to the flow direction F, and a third wave-shape along the third portion 28, 38 in the flow direction F. The wave-shapes are continuous, i.e. there are no sharp transitions.

The sheets 24, 34 are arranged beside each other along the first portion 26, 36 in such a way that substantially each pair of adjacent sheets 24, 34 abuts each other at valleys and ridges, respectively, of said wave-shape to permit each passage 23, 33 between two adjacent sheets 24, 34 to form a plurality of inlet channels arranged beside each other.

In the same way, the sheets 24, 34 are arranged beside each other along the second portion 27, 37 in such a way that substantially each pair of adjacent sheets 24, 34 abuts each other at valleys and ridges, respectively, of said wave-shape to permit each passage 23, 33 between two adjacent sheets 24, 34 to form a plurality of outlet channels arranged beside each other. Each inlet channel may have the same, or substantially the same, flow area as each outlet channel. A centre line of substantially each inlet channel may be concentric, or substantially concentric, with a centre line of a respective corresponding outlet channel.

The sheets 24, 34 may be connected to each other said valleys and ridges, respectively. The sheets 24, 34 may then be connected to each other by means of a fuse weld or a spot weld where the sheets 24, 34 abut each other.

Substantially each wave of said wave-shape of the first portion 26, 36 and of the second portion 27, 37 may have a maximum amplitude, wherein the maximum amplitude decreases continuously in the direction towards the third portion 28, 38. The maximum amplitude may be zero, or substantially zero, at the transition to the third portion 28, 38.

Each passage 23, 24 of the third portion 28, 38 forms an intermediate channel between two adjacent sheets. The sheets along the third portion 28, 38 may at least include a part portion extending in parallel, or substantially in parallel, with a direction transversally to the flow direction F.

The third portion 28, 38 may include projections 29, 39 extending into the intermediate channel. The projections 29, 39 may be arranged along a line extending in parallel, or substantially in parallel, with a direction transversally to the flow direction F, wherein one such part portion is arranged on each side of the projections 29, 39.

According to a twelfth embodiment of the invention, the third portion 38 of the second filter zone 30 may have such projections 39, whereas the third portion 28 of the second filter zone 20 has no such projection 29. Thus the projections 39 may provide the second filtering efficiency.

Figure 11:
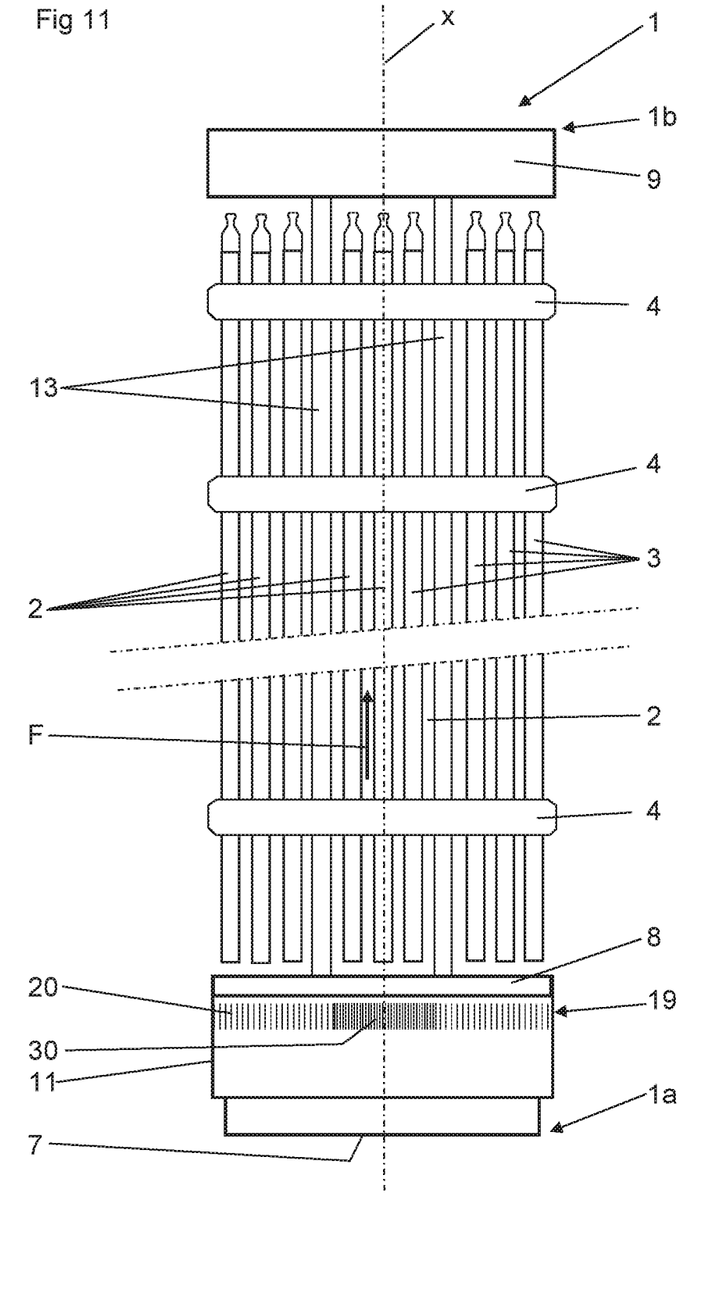
FIG. 11 discloses a longitudinal section through a fuel assembly according to an eighth embodiment of the present invention.

FIG. 11 discloses an eighth embodiment of a fuel assembly 1 configured to be positioned in a nuclear water reactor, and more precisely in pressure water reactor, PWR.

It should be noted, that the same reference signs have been used for similar or corresponding elements in all the embodiments disclosed.

Also the fuel assembly 1 according to the eighth embodiment has an elongated shape and extends along a longitudinal axis x between an upstream end 1a and a downstream end 1b. During use of the fuel assembly 1 in the reactor, the upstream end 1a forms a lower end and the downstream end 1b forms an upper end of the fuel assembly 1. A flow interspace 2 is provided between the upstream end 1a and the downstream end 1b.

A plurality of fuel rods 3 is provided in the flow interspace 2 between the upstream end 1a and the downstream end 1b. The fuel rods 3 are held by means of spacers 4. In the eighth embodiment, the spacers 4 are attached to a number of guide tubes 13, two of which are shown in FIG. 11. The guide tubes 13 contains coolant during normal operation and are configured to receive a respective control rod when the operation of the PWR is to be interrupted.

In contrast to a fuel assembly 1 for a BWR, the fuel assembly 1 according to the eighth embodiment has no casing, but still comprises a flow interspace 2 for a flow of coolant from the upstream end 1a to the downstream end 1b in contact with the fuel rods 3.

The guide tubes 13 are attached to a bottom plate 8 provided beneath the fuel rods 3, and to a top plate 9 at the downstream end 1a. The bottom plate 8, the guide tubes 13, the top plate 9 and the spacers 4 form a support structure which carries the weight of the fuel rods 3.

The fuel assembly 1 also comprises a bottom piece 11. The bottom piece 11 extends to the upstream end 1a and defines the inlet 7 for the flow of coolant. The bottom piece 11 may be attached to the bottom plate 8.

The fuel assembly 1 also comprises a filter device 19 configured to catch debris particles in the flow of coolant. The filter device 20 is provided between the upstream end 1a and the fuel rods 3. In the eighth embodiment, the filter device 19 is provided between the upstream end 1a and the bottom plate 8. Also the filter device 19 of the eighth embodiment comprises a first filter zone 20 and a second filter zone 30.

In the eighth embodiment, the first filter zone 20 and the second filter zone 30 are both provided in the flow of coolant between the upstream end 1a and the fuel rods 3, and more precisely between the upstream end 1a and the bottom plate 8. Furthermore, the first filter zone 20 and the second filter 30 zone are provided beside each other. The first filter zone 20 is greater than the second filter zone 30, i.e. the first filter zone 20 constitutes major part of the total flow area of the flow interspace 2 and the second filter zone 30 constitutes a minor part of the total flow area of the flow interspace 2.

The filter device 19 may thus be configured in the same way as in the first embodiments. Especially, the first filter zone 20 and the second filter zone 30 may be configured as in the second and third embodiments.

Figure 12:
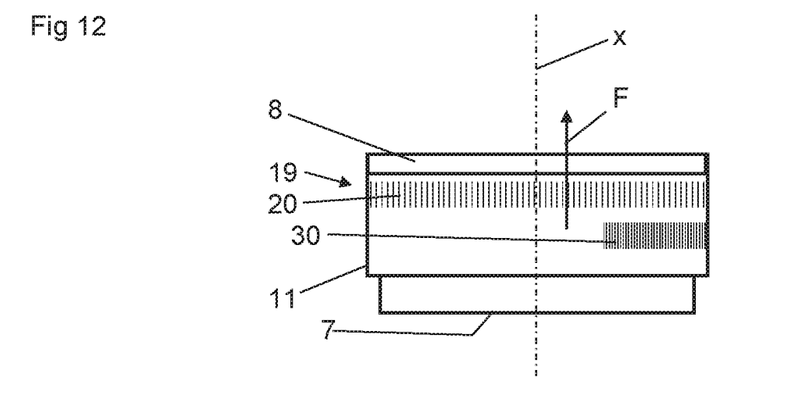
FIG. 12 discloses a longitudinal section through a lower portion of a fuel assembly according to a ninth embodiment of the invention.

FIG. 12 discloses a ninth embodiment with a filter device 19 for a fuel assembly 1 of a PWR. The filter device 19 corresponds to the one of the fourth embodiment, i.e. the second filter zone 30 is provided at a distance from the first filter zone 20 along the flow direction F, and more precisely, the second filter zone 30 is provided upstream the first filter zone 20. In the ninth embodiment, the filter device 19 is thus provided in the flow interspace 2 to guide the entire flow of coolant through the first filter zone 20. A minor part of the flow of coolant will be guided through the second filter zone 30.

Figure 13:
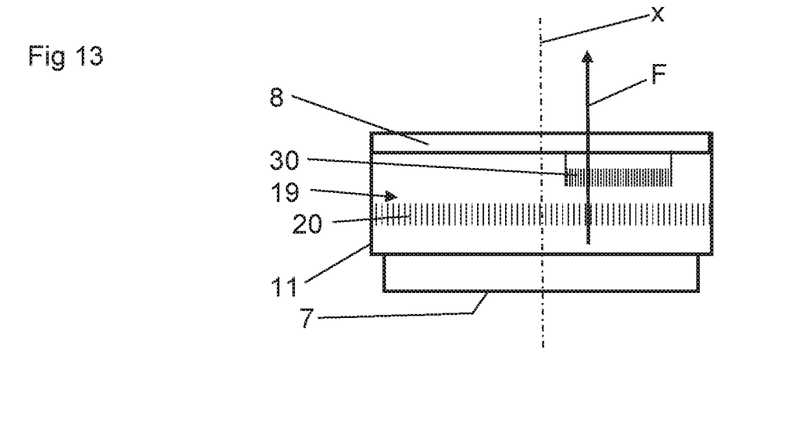
FIG. 13 discloses a longitudinal section through a lower portion of a fuel assembly according to a tenth embodiment of the invention.

FIG. 13 discloses a tenth embodiment, which differs from the ninth embodiment only in that the second filter zone 30 is provided downstream the first filter zone 20.

It is to be noted that all the variants of the filter devices 19 disclosed above for the first to seventh embodiments concerning a BWR are applicable also to fuel assemblies for a PWR.

The present invention is not limited to the embodiments disclosed but may be varied and modified within the scope of the following claims.

What is claimed is:

1. A fuel assembly configured to be positioned in a nuclear water reactor, wherein the fuel assembly comprises:
    an upstream end,
    a downstream end,
    a flow interspace between the upstream end and the downstream end,
    a plurality of fuel rods provided in the flow interspace between the upstream end and the downstream end, the flow interspace being configured to permit a flow of coolant through the fuel assembly along a flow direction from the upstream end to the downstream end in contact with the fuel rods,
    a filter device configured to catch debris particles in the flow of coolant,
    wherein the filter device comprises a first filter zone provided in the flow of coolant between the upstream end and the fuel rods, and a second filter zone,
    wherein the first filter zone comprises a plurality of passages arranged to guide at least a part of the flow of coolant to pass the first filter zone through the passages towards the downstream end,
    wherein the second filter zone comprises a plurality of passages arranged to guide at most a part of the flow of coolant to pass the second filter zone through the passages towards the downstream end,
    wherein the first filter zone has a first filtering efficiency and the second filter zone has a second filtering efficiency,
    wherein the second filtering efficiency is higher than the first filtering efficiency, and
    wherein the passages of the first filter zone and the second filter zone are formed by a plurality of sheets, which are arranged beside each other and oriented along the flow direction, and wherein adjacent sheets of the first filter zone are provided at a larger distance from each other than adjacent sheets of the second filter zone.

2. The fuel assembly according to claim 1, wherein the second filter zone is dimensioned to permit the second filter zone to be clogged and wherein the first filter zone is configured to secure a sufficient flow of coolant through the first filter zone even if no coolant passes the second filter zone.

3. The fuel assembly according to claim 1, wherein the first filter zone comprises an inlet end turned towards the upstream end, and an outlet end, and is arranged to guide said at least a part of the flow of coolant to pass the first filter zone through the passages from the inlet end to the outlet end, and wherein the second filter zone comprises an inlet end turned towards the upstream end, and an outlet end, and is arranged to guide said at most a part of the flow of coolant to pass the second filter zone through the passages from the inlet end to the outlet end.

4. The fuel assembly according to claim 1, wherein the first filter zone and the second filter zone are provided beside each other.

5. The fuel assembly according to claim 1, wherein each of the passages of the first filter zone defines a first flow area and each of the passages of the second filter zone defines a second flow area, which is smaller than the first filter area.

6. The fuel assembly according to claim 1, wherein each of the passages of the first filter zone defines a first passage length from an inlet end to an outlet end, and each of the passages of the second filter zone defines a second passage length from an inlet end to an outlet end, which second passage length is longer than the first passage length.

7. The fuel assembly according to claim 1, wherein the first filter zone has a first pressure loss coefficient $\xi_1$ and the second filter zone a second pressure loss coefficient $\xi_2$ and wherein the second pressure loss coefficient $\xi_2$ is greater than the first pressure loss coefficient $\xi_1$.

8. The fuel assembly according to claim 1, wherein the first filter zone has a first flow area $A_1$ and the second filter zone a second flow area $A_2$ and wherein the first flow area $A_1$ is greater than the second flow area $A_2$.

9. The fuel assembly according to claim 1, wherein the filter device comprises a magnetic member provided to create a magnetic field on at least some of the passages of the second filter zone to attract debris particles flowing through the passages of the second filter zone.

10. The fuel assembly according to claim 1, wherein the filter device is provided in the flow interspace to guide at most a minor part of the flow of coolant through the second filter zone.

11. The fuel assembly according to claim 10, wherein the filter device is provided in the flow interspace to guide at least a major part of the flow of coolant through the first filter zone.

12. The fuel assembly according to claim 1, wherein the filter device is provided in the flow interspace to guide the entire flow of coolant through the first filter zone.

13. The fuel assembly according to claim 12, wherein the second filter zone is provided at a distance from the first filter zone.

14. The fuel assembly according to claim 13, wherein the second filter zone is provided downstream the first filter zone.

15. The fuel assembly according to claim 13, wherein the second filter zone is provided upstream the first filter zone.

16. The fuel assembly according to claim 1, wherein each sheet comprises a first portion, which extends from the inlet end, a second portion, which extends from the outlet end, and a third portion, which extends between the first portion and the second portion, and wherein each sheet along the first portion has a wave-shape extending in a direction transversally to the flow direction and along the third portion has a wave-shape extending in the flow direction.

17. The fuel assembly according to claim 16, wherein each sheet along the second portion has a wave-shape in the direction transversally to the flow direction.

* * * * *